US009584367B2

(12) United States Patent
Zizlavsky et al.

(10) Patent No.: US 9,584,367 B2
(45) Date of Patent: Feb. 28, 2017

(54) NODE DE-DUPLICATION IN A NETWORK MONITORING SYSTEM

(71) Applicant: SOLARWINDS WORLDWIDE, LLC, Austin, TX (US)

(72) Inventors: Marek Zizlavsky, Turcianske Teplice (SK); Tomas Pospisil, Kostelec u Holesova (CZ); Tomas Mrkvicka, Habry (CZ)

(73) Assignee: SOLARWINDS WORLDWIDE, LLC, Austin, TX (US)

( * ) Notice: Subject to any disclaimer, the term of this patent is extended or adjusted under 35 U.S.C. 154(b) by 134 days.

(21) Appl. No.: 14/072,150

(22) Filed: Nov. 5, 2013

(65) Prior Publication Data

US 2015/0127806 A1    May 7, 2015

(51) Int. Cl.
G06F 11/30    (2006.01)
H04L 12/24    (2006.01)
H04L 29/12    (2006.01)

(52) U.S. Cl.
CPC ...... *H04L 41/0866* (2013.01); *H04L 41/0853* (2013.01); *H04L 41/0873* (2013.01); *H04L 61/1541* (2013.01)

(58) Field of Classification Search
CPC .......... H04L 41/0853; H04L 41/0866; H04L 41/0873; H04L 61/1541; H04L 12/24;
(Continued)

(56) References Cited

U.S. PATENT DOCUMENTS 3,653,729 A * 4/1972 Newell et al. .................. 303/50
4,170,147 A * 10/1979 Durno et al. ..................... 74/96
(Continued)

FOREIGN PATENT DOCUMENTS

EP    2 051 446 A1    4/2009
JP    2001-356938 A    12/2001

OTHER PUBLICATIONS

"Unique network node identification algorithm" Disclosure by Hewlett-Packard Company, Zhi qiang Wang, Joseph Elisha Taylor, Wei Wen Chen, Zhenjun Cao. Reasearch Disclosure database No. 582062. Published in the Oct. 2012 paper journal.*
(Continued)

*Primary Examiner* — David Lazaro
*Assistant Examiner* — Berhanu Shitayewoldetsadi
(74) *Attorney, Agent, or Firm* — Squire Patton Boggs (US) LLP (57) ABSTRACT

Systems, methods, apparatuses, and computer program products for node de-duplication. One method includes discovering, by a network monitoring apparatus, nodes in a network, and collecting a list of internet protocol (IP) addresses, media access control (MAC) addresses, domain name system (DNS) names, and sysnames for each of the nodes discovered in the network. The method may also include comparing the collected list of information for each of the discovered nodes with corresponding information for current nodes and other discovered nodes. The method may then includes determining duplicate nodes that are duplicates of the other discovered nodes and/or the current nodes based on the comparison of the IP addresses, MAC addresses, DNS names, and sysnames.

12 Claims, 6 Drawing Sheets

(58) Field of Classification Search
CPC .......... H04L 29/12; G06F 13/00; G06F 11/30; G06F 3/067
USPC ....... 709/224, 225, 232, 245, 227, 229, 204, 709/207, 210; 710/104; 370/254, 400; 707/100
See application file for complete search history.

(56) References Cited

U.S. PATENT DOCUMENTS

| | | | |
|---|---|---|---|
| 4,493,076 A * | 1/1985 | Khimeche et al. | 714/11 |
| 5,111,395 A * | 5/1992 | Smith et al. | 705/45 |
| 5,129,076 A * | 7/1992 | Freeman et al. | 711/111 |
| 5,249,188 A * | 9/1993 | McDonald | 714/53 |
| 5,375,237 A * | 12/1994 | Tanaka et al. | |
| 5,384,697 A * | 1/1995 | Pascucci | 700/10 |
| 5,390,316 A * | 2/1995 | Cramer et al. | 709/201 |
| 5,530,849 A * | 6/1996 | Hanushevsky et al. | |
| 5,572,421 A * | 11/1996 | Altman et al. | 705/3 |
| 5,577,252 A * | 11/1996 | Nelson et al. | 718/100 |
| 5,600,827 A * | 2/1997 | Nakabayashi et al. | |
| 5,995,999 A * | 11/1999 | Bharadhwaj | 709/200 |
| 6,108,649 A * | 8/2000 | Young et al. | |
| 6,332,142 B1 * | 12/2001 | LeBlanc | 717/118 |
| 6,513,710 B1 * | 2/2003 | Haas | 235/380 |
| 6,636,587 B1 * | 10/2003 | Nagai et al. | 379/88.14 |
| 6,744,436 B1 * | 6/2004 | Chirieleison et al. | 345/427 |
| 6,985,926 B1 * | 1/2006 | Ferlauto et al. | 709/206 |
| 7,028,221 B2 * | 4/2006 | Holland et al. | 714/31 |
| 7,386,559 B1 * | 6/2008 | Desai et al. | |
| 7,392,356 B1 * | 6/2008 | Hardman | 711/162 |
| 2001/0049747 A1 * | 12/2001 | Stanbach | 709/245 |
| 2002/0010794 A1 * | 1/2002 | Stanbach, Jr. et al. | 709/245 |
| 2002/0016871 A1 * | 2/2002 | Graf | 710/5 |
| 2002/0023232 A1 * | 2/2002 | Serani et al. | 713/202 |
| 2002/0052884 A1 * | 5/2002 | Farber et al. | 707/104.1 |
| 2002/0124066 A1 * | 9/2002 | Chang et al. | 709/223 |
| 2002/0156883 A1 * | 10/2002 | Natarajan et al. | 709/224 |
| 2002/0174275 A1 * | 11/2002 | Jay et al. | 710/104 |
| 2003/0014518 A1 | 1/2003 | Richard | |
| 2003/0020749 A1 * | 1/2003 | Abu-Hakima et al. | 345/752 |
| 2003/0046430 A1 * | 3/2003 | Iwade et al. | 709/246 |
| 2003/0088653 A1 * | 5/2003 | Wilks | 709/223 |
| 2004/0059706 A1 * | 3/2004 | Abelite | 707/1 |
| 2004/0073704 A1 * | 4/2004 | Paunikar et al. | 709/245 |
| 2004/0098546 A1 * | 5/2004 | Bashant et al. | 711/156 |
| 2004/0117478 A1 * | 6/2004 | Triulzi et al. | 709/224 |
| 2004/0151128 A1 * | 8/2004 | Wechter et al. | 370/254 |
| 2004/0202339 A1 * | 10/2004 | O'Brien et al. | 381/312 |
| 2004/0258007 A1 * | 12/2004 | Nam et al. | 370/310 |
| 2005/0086377 A1 * | 4/2005 | Aso | 709/245 |
| 2005/0102672 A1 * | 5/2005 | Brothers | 718/1 |
| 2005/0154791 A1 * | 7/2005 | Sutou | 709/223 |
| 2006/0020817 A1 * | 1/2006 | Serani et al. | 713/182 |
| 2006/0101026 A1 * | 5/2006 | Fukushima | 707/100 |
| 2006/0123486 A1 * | 6/2006 | Serani et al. | 726/27 |
| 2006/0137026 A1 * | 6/2006 | Serani et al. | 726/27 |
| 2006/0225125 A1 * | 10/2006 | Shih et al. | 726/2 |
| 2006/0268758 A1 * | 11/2006 | Serani et al. | 370/320 |
| 2007/0050178 A1 * | 3/2007 | Linzey et al. | 703/2 |
| 2007/0162308 A1 * | 7/2007 | Peters | 705/2 |
| 2007/0180206 A1 * | 8/2007 | Craft et al. | 711/162 |
| 2007/0206224 A1 * | 9/2007 | Nagashima et al. | 358/1.16 |
| 2007/0214491 A1 * | 9/2007 | Serani et al. | 726/1 |
| 2007/0245013 A1 * | 10/2007 | Saraswathy et al. | 709/223 |
| 2008/0092140 A1 * | 4/2008 | Doninger et al. | 718/102 |
| 2008/0120129 A1 * | 5/2008 | Seubert et al. | 705/1 |
| 2008/0126828 A1 * | 5/2008 | Girouard et al. | 714/2 |

OTHER PUBLICATIONS

"Mix-n-Match: Building personal ibraries from web content" Matthias Geel, Timothy Church, and Moria C.Norrie. Institute for Information System, ETH Zurich Ch-8092 Zurich, Switzerland.*

Zhi Qiang Wang et al., "Unique Network Node Identification Algorithm", The Industry standard Disclosure Publication Service, Oct. 2012.

Matthias Geel et al., "Mix-n-Match: Building Personal Libraries from Web Content", Institute for Information Systems, ETH Zurich, Switzerland, 2012.

European Search Report application No. 14191409.3 dated Apr. 2, 2015.

Examination Report dated Nov. 20, 2015, issued in corresponding AU patent application No. 2014259482.

"Duplicate Node", Forum Post, Solarwinds Thwack Community, May 2, 2013 [retrieved on Nov. 20, 2015], Retrieved from the Internet. <URL: https://thwack.solarwinds.com/thread/56234>.

Office Action mailed Oct. 6, 2015, issued in corresponding JP Application No. 2014-224222 (with English translation).

Office Action dated Jan. 8, 2016, issued in corresponding CA application No. 2,869,071.

Notice of Allowance dated May 31, 2016 corresponding to Japanese Patent Application No. 2014-224222.

Canadian Office Action dated Dec. 9, 2016, issued in corresponding CA Application No. 2,869,071.

European Office Action dated Dec. 19, 2016, issued in corresponding EP Application No. 14 191 4093-1862.

* cited by examiner

NODE DE-DUPLICATION IN A NETWORK MONITORING SYSTEM

BACKGROUND

Field

Embodiments of the invention generally relate to network traffic monitoring, analysis, and/or reporting. More particularly, some embodiments are directed to methods, systems, and computer programs for node de-duplication of physical nodes monitored by a network monitoring system, for example.

Description of the Related Art

Network management includes activities, methods, procedures, and tools related to the operation, administration, maintenance, and/or provisioning of networked systems. Functions that can be performed as part of network management may include, for example, planning, controlling, deploying, allocating, coordinating, and monitoring the resources of a network. Further functions may be related to network planning, frequency allocation, load balancing, configuration management, fault management, security management, performance management, bandwidth management, route analytics, and accounting management.

As mentioned above, a subset of network management includes network monitoring of network traffic. Network traffic data is of interest to network administrators for a number of reasons, including analyzing the impact of a new application on the network, troubleshooting network pain points, detecting slow or failing network devices, detecting heavy users of bandwidth, and securing networks. Various protocols for network traffic flow data have been developed. These protocols can contain numerous types of information, such as source internet protocol (IP) address, destination IP address, source port, destination port, IP protocol, ingress interface, IP Type of Service, start and finish times, number of bytes, and next hop.

As networks become larger and more complex, systems that monitor, analyze, and report on traffic flow data must become more efficient at handling the increasing number of network devices and amount of information generated about network traffic.

SUMMARY

Certain embodiments are directed to methods, apparatuses, and computer program products for node de-duplication. One method includes discovering, by a network monitoring apparatus, nodes in a network. The method may further include collecting a list of internet protocol (IP) addresses, media access control (MAC) addresses, domain name system (DNS) names, and sysnames for each of the nodes discovered in the network, comparing the IP addresses of each of the discovered nodes with IP addresses of current nodes and other discovered nodes, comparing the MAC addresses of each of the discovered nodes with MAC addresses of the current nodes and the other discovered nodes, comparing the DNS names of each of the discovered nodes with DNS names of the current nodes and the other discovered nodes, comparing the sysnames of each of the discovered nodes with sysnames of the current nodes and the other discovered nodes, and determining duplicate nodes that are duplicates of the other discovered nodes and/or the current nodes based on the comparison of the IP addresses, MAC addresses, DNS names, and sysnames.

BRIEF DESCRIPTION OF THE DRAWINGS

For proper understanding of the invention, reference should be made to the accompanying drawings, wherein.

DETAILED DESCRIPTION

It will be readily understood that the components of the invention, as generally described and illustrated in the figures herein, may be arranged and designed in a wide variety of different configurations. Thus, the following detailed description of the embodiments of systems, methods, apparatuses, and computer program products for node de-duplication, as represented in the attached figures, is not intended to limit the scope of the invention, but is merely representative of selected embodiments of the invention.

The features, structures, or characteristics of the invention described throughout this specification may be combined in any suitable manner in one or more embodiments. For example, the usage of the phrases "certain embodiments," "some embodiments," or other similar language, throughout this specification refers to the fact that a particular feature, structure, or characteristic described in connection with the embodiment may be included in at least one embodiment of the present invention. Thus, appearances of the phrases "in certain embodiments," "in some embodiments," "in other embodiments," or other similar language, throughout this specification do not necessarily all refer to the same group of embodiments, and the described features, structures, or characteristics may be combined in any suitable manner in one or more embodiments. Additionally, if desired, the different functions discussed below may be performed in a different order and/or concurrently with each other. Furthermore, if desired, one or more of the described functions may be optional or may be combined. As such, the following description should be considered as merely illustrative of the principles, teachings and embodiments of this invention, and not in limitation thereof.

It should be noted that throughout this specification the terms network devices and network nodes, or simply devices or nodes, may be used interchangeably to refer to any physical device that is capable of connecting to and/or communicating on a network. Examples of such devices or nodes may include, but is not limited to, routers, switches, servers, computers, laptops, tablets, telephones, printers, mobile devices, and any other current or future component capable of sending, receiving, or forwarding information over a communications channel.

Figure 1:
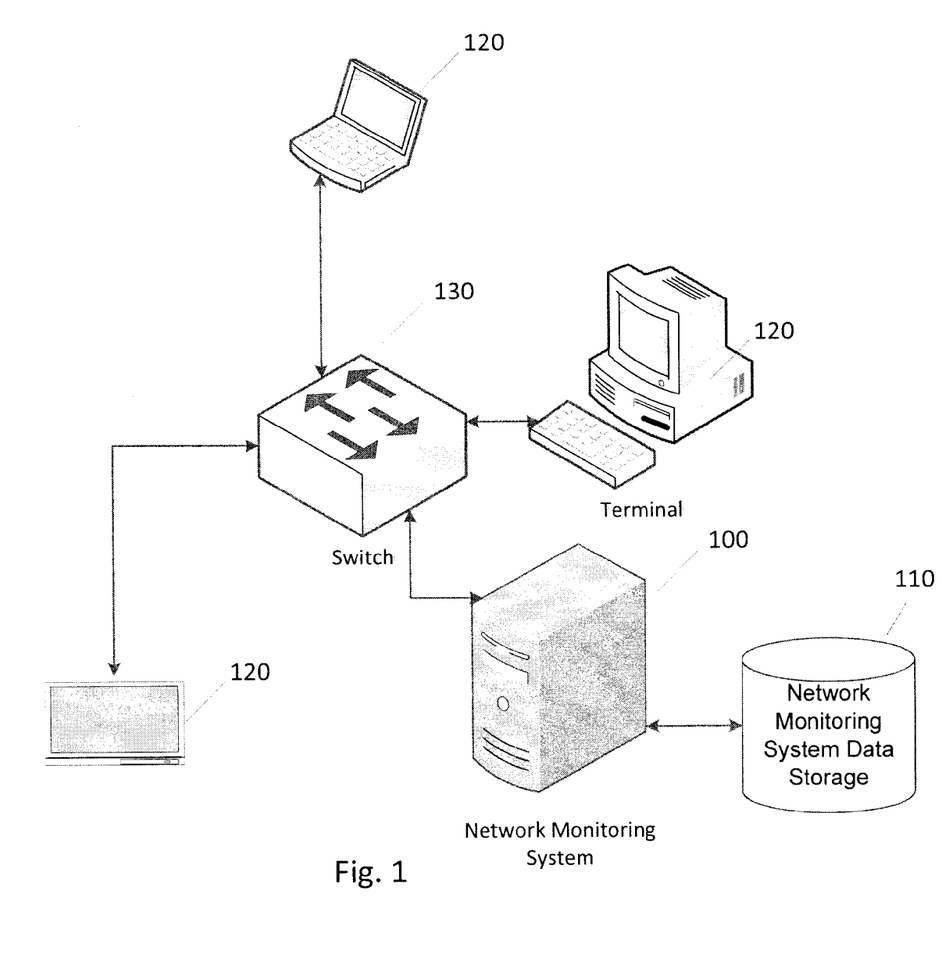
FIG. 1 illustrates a block diagram of a system according to an embodiment.

FIG. 1 illustrates an example of a system according to one embodiment. The system includes network monitoring system 100, network monitoring system storage 110, switch device 130, and one or more network devices 120. Network monitoring system storage 110 can store network monitoring data. Network monitoring system storage 110 can be a database or any other appropriate storage device. Network devices 120 may be nodes in the network that are monitored by network traffic monitor 100. It should be noted that any number and type of network devices 120 can be supported in the system. Accordingly, embodiments are not limited to the number and type of network devices illustrated in FIG. 1. In an embodiment, network monitoring system storage 110 may store discovery result database tables that store and organize information about discovered network devices in the network.

In some cases, network devices can be accessible on multiple internet protocol (IP) addresses. For example, some devices can simultaneously have more than one IP address. Also, some nodes are dynamic in that they have IP addresses that vary in time. Such dynamic IP addresses cause problems for de-duplication logic because it might be matching an outdated primary IP address from discovery result with the current IP address of a dynamic node.

Currently, systems generally apply logic where one IP address equals one network node. As a result, nodes with multiple IP address bindings may not be recognized as a single node. This behavior can result in a state where one physical device is being monitored more than once, which can obviously cause additional overhead and inefficiencies in the network monitoring system.

Therefore, users usually want to have devices which respond on multiple IP addresses monitored as a single node in the network. Embodiments of the invention implement an automatic network discovery that is able to detect such situation and avoid processing the same physical node multiple times (e.g., each time using a different IP address). One embodiment includes a de-duplication logic configured to automatically identify duplicate nodes such that a single node is not monitored multiple times.

Certain embodiments identify one or more pieces of information that function as a node identifier needed to uniquely identify the network node. Having this unique node identifier, certain embodiments can proceed with defining logic, which detects duplicates within nodes found during the discovery process (e.g., same physical network node under different IP addresses) and/or within nodes already being monitored under a different IP address.

According to certain embodiments, the information used to uniquely identify nodes includes information which can be polled easily, is available for a majority of devices (i.e., vendor independent), is available for Internet Control Message Protocol (ICMP) nodes as well as other types of nodes (e.g., ICMP nodes can be considered to be nodes not reachable over SNMP or WMI), and is a minimal set of information that can still provide accurate results while being efficient.

Certain embodiments can handle at least two typical uses cases. For example, one use case may include running an automated network discovery over a subnetwork, which contains devices accessible on multiple IP addresses. As is known, devices that belong to a subnet are addressed with a common, identical, most-significant bit-group in their IP address. Another use case may include running an automated network discovery over a subnetwork, which is already being monitored.

Certain embodiments are able to identify network nodes as network duplicates, even if one set of information was collected in a different time frame than the other. For instance, this may occur when a user decides to import discovery results for a scheduled discovery profile. In such a case, some embodiments may need to work with possibly outdated information collected during discovery and compare it to new information, which is being continuously collected for all monitored nodes. Accordingly, de-duplication according to certain embodiments can take place during a discovery job where discovered nodes are compared to each other such that duplicates are removed, and/or can take place during a discovery result importing where discovered nodes are imported and compared against existing nodes (e.g., nodes stored in network monitoring system storage or database) such that duplicate nodes are identified and removed.

According to an embodiment, a data collection set made up of DNS name, Sysname, IP address, and MAC address for each network node is used to help identify duplicate nodes. One embodiment includes logic which compares pieces of information from the data collection set against each other, for example DNS to DNS, MACs to MACs, etc. The logic may be implemented in a Duplicate Detector component. A result from the detection is the match index, which indicates whether there is a match, no match, or unknown. Certain embodiments also provide logic for aggregating partial results from detectors and calculating a final verdict as to whether a node is a duplicate or not. For example, in an embodiment, the node de-duplication may include several sub-iterations that are each responsible for discovering selected IP-range. At the end of every iteration, de-duplication is performed to omit nodes (e.g., endpoints) as soon as they are thought to be duplicates. In case of an unknown or non-duplicate result for one iteration, the node is passed to the next step or iteration for processing.

In an embodiment, two sets of duplicate detectors may be provided. One set of detectors can be used during the automated discovery process to filter out newly found devices and remove duplicates. Another set of detectors can be used during discovery result import to avoid adding duplicate nodes into set of monitored nodes.

In one embodiment, the system is configured to collect list of all DNS names, Sysnames, IP addresses, and MAC addresses for all discovered nodes, and to store them, for example, as part of a discovery job result. This information may be stored in the network system monitoring storage or database 110. As mentioned above, this information can be used during at least two phases of discovery. For instance, the DNS names, Sysnames, IP addresses, and MAC addresses can be used when running discovery to check whether currently discovered node(s) are a duplicate of any other already found, and/or can be used during discovery result importing to compare discovery result(s) with existing nodes monitored by the system. In one embodiment, the MAC information is stored to a persistent storage, for example, as part of discovery result.

Figure 2:
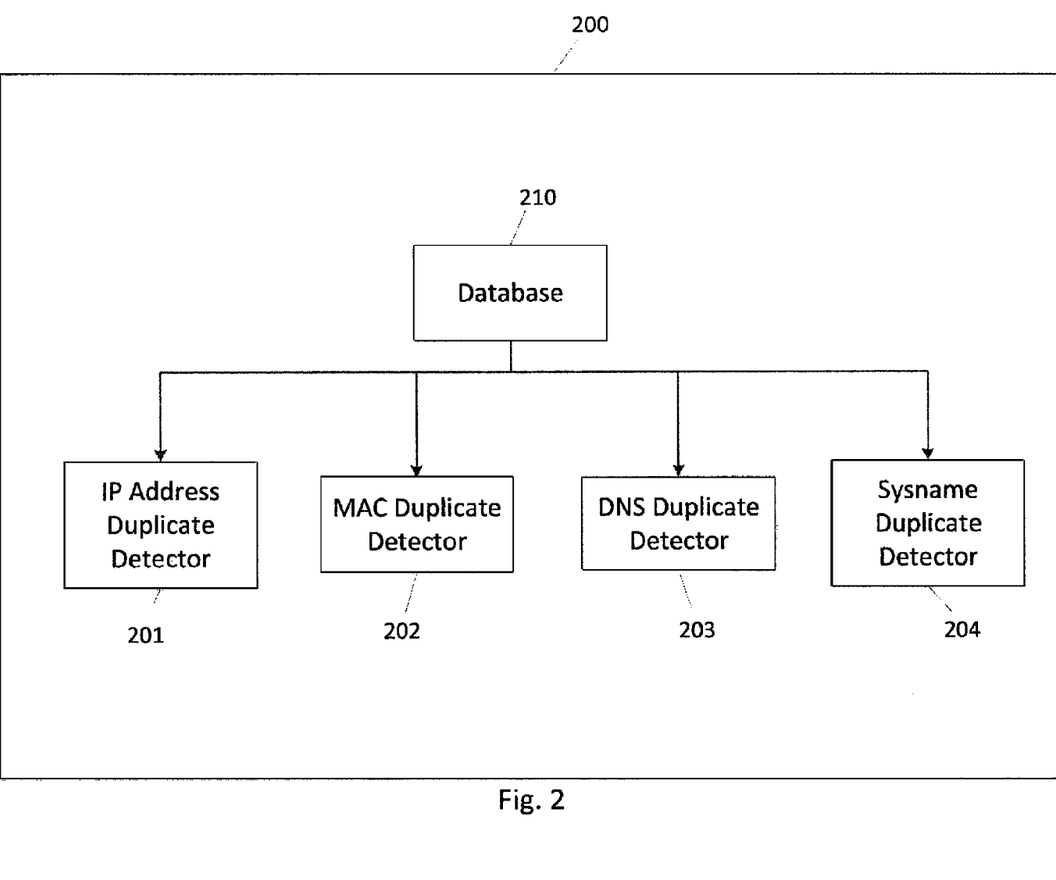
FIG. 2 illustrates a block diagram of a system according to one embodiment.

FIG. 2 illustrates a system 200, according to one embodiment, which may include an IP address duplicate detector 201, a DNS duplicate detector 203, a MAC address duplicate detector 202, and a Sysname duplicate detector 204. In an embodiment, a database 210 may be in communication with the IP address duplicate detector 201, DNS duplicate detector 203, MAC address duplicate detector 202, and Sysname duplicate detector 204 such that each of the detectors can collect the relevant addresses stored in the database 210. In an embodiment, the database 210 may be stored in the network traffic data storage 110 illustrated in FIG. 1. It should be noted that system 200 can be implemented completely in hardware, or in a combination of hardware and software.

Each of the duplicate detectors 201, 202, 203, 204 may have a defined priority of order of execution (e.g., lower number indicates earlier execution), a weight which indicates the reliability of the result provided by the duplicate detector (e.g., a weight of 0 will have no impact on final result), and a veto that is used as a top priority to determine if a node is a duplicate or not.

DNS duplicate detector 203 may be configured to compare a DNS of a discovered node with all other discovered nodes and current nodes being monitored. In an embodiment, DNS duplicate detector 203 may conclude that a node is a duplicate if the DNS of a discovered node is the same as a DNS used by any of the monitored nodes or any of the other discovered nodes.

MAC addresses are generally unique by design (although there are situations where the same MAC address is used on two different devices, for example cloned virtual machines hosted in two separated virtual hosts). MAC address duplicate detector 202 may be configured to compare a MAC address of a discovered node against all previously collected MAC addresses of nodes, which may be stored in a NodeMACAddresses database table in database 210. MAC address duplicate detector 202 may be configured to conclude that a node is a duplicate if a set of discovered MAC addresses is a sub-set of currently monitored MAC addresses for a node or if a set of monitored MAC addresses is sub-set of discovered MAC addresses.

Table 1 below illustrates an example where the nodes are considered equal according to the MAC address duplicate detector 202, where A, B, C, . . . represent MAC addresses. Meanwhile, Table 2 below illustrates an example where the nodes are not considered equal (e.g., based on MAC addresses).

TABLE 1

| Node A | Node B | Node C | Node D |
|--------|--------|--------|--------|
| A | A | A | A |
| B | B | B | B |
| C | C |   | C |
|   |   |   | D |

TABLE 2

| Node A | Node B | Node C | Node D |
|--------|--------|--------|--------|
| A | A | D | A |
| B | B | E | D |
| C | D | F |   |

Two nodes, which both have just two MAC addresses, for instance 0000000000000000 and 00000000000000E0 should be considered as equal. For instance, Node A and Node B are equal when and only when Node A's list of MAC addresses is subset of Node B's list of MAC addresses or Node B's list of MACs is subset of Node A's list of MAC. In that case, the system may look to a different duplicate detector or different de-duplication method (e.g., sysname matching) since, according to MAC addresses, the two nodes are equal.

Sysname duplicate detector 204 may be configured to compare a sysname of a discovered node with all other discovered nodes and current nodes being monitored. In an embodiment, Sysname duplicate detector 204 may conclude that a node is a duplicate if the Sysname of a discovered node is the same as a Sysname used by any of the monitored nodes or any of the other discovered nodes. In an embodiment, the Sysname may be the Sysname for Simple Network Management Protocol (SNMP) nodes or may be the full computer name for window management instrumentation (WMI) nodes, for example. It should be noted that embodiments do not limit data sources to SNMP and/or WMI, and other types of data sources are equally applicable according to certain embodiments (e.g., CLI over SSH on routers/switches or telnet, etc.).

As mentioned above, each duplicate detector may load an associated weight from a settings database table. The weight represents the reliability of the result provided by the associated duplicate detector. It is possible to set the weight to −1 to disable the associated duplicate detector. According to an embodiment, weight values may range from 0 to 100 where 0 represents the least reliable and 100 represents the most reliable.

All of the duplicate detectors ($d_1$, . . . , $d_n$) may be executed sequentially with order defined by priority, as discussed above. Each of the duplicate detectors may set an 'IsAuthoritative' flag to be true, which may then terminate execution of following duplicate detectors. In such a case, the vote of the duplicate detector with the 'IsAuthoritative' flag set to true is considered as final, ignoring all other votes. According to one embodiment, if there is no 'IsAuthoritative' flag set to true, a final result as to whether a node is a duplicate is computed as a sum of all duplicate detector vote result values as follows:

$$\text{Final Decision} = d_1.\text{IsDuplicate}(\ )^* d_1.\text{Priority} + \ldots + d_n.\text{IsDuplicate}(\ )^* d_n.\text{Priority},$$

where $d_1$ is a first duplicate detector, $d_2$ is a second duplicate detector, . . . and $d_n$ is an $n^{th}$ duplicate detector. Accordingly, $d_n$.IsDuplicate( ) is a function representing the nth duplicate detector's conclusion as to whether a node is a duplicate.

As illustrated in Table 3 below, Each duplicate detector may return a list of node IDs for all duplicate nodes it finds. Each node ID may have an associated MatchIndex assigned, which indicates the likelihood of the match. In an embodiment, the range of MatchIndex values is 0 to 100, where 0 indicates the least likelihood of a match and 100 indicates the greatest likelihood of a match. According to an embodiment, system 200 may be configured to group the duplicate node information depicted in Table 3 by node ID, and to sum the MatchIndexes for the same node ID. Then, system 200 may be configured to select the node ID with the highest summed total MatchIndex for discarding.

TABLE 3

| Duplicate Detector | DuplicateNodeID | MatchIndex |
|--------------------|-----------------|------------|
| Dns | 5 | 90 |
| Mac | 1 | 60 |
| Mac | 5 | 80 |
| Sysname | 5 | 85 |
| Final Decision: | 5 | 90 |

Table 4 below illustrates an example results table, according to an embodiment. In this example, each row of the table may represent a node. The 'DnsDuplicateDetector' column shows the conclusion of the DNS duplicate detector as to whether the node is a duplicate or not. Similarly, the 'MacAddressDuplicateDetector' column shows the conclusion of the MAC address duplicate detector as to whether the node is a duplicate or not, and the 'NameDuplicateDetector' column shows the conclusion of the Sysname duplicate detector as to whether the node is a duplicate or not. Then, the final 'Expected Result' column shows the expected result for the node.

TABLE 4

| DnsDuplicateDetector | MacAddressDuplicateDetector | NameDuplicateDetector | Expected Result |
|---|---|---|---|
| Is Duplicate | Is Duplicate | Is Duplicate | Is Duplicate |
| Is Duplicate | Is Duplicate | Don't know | Is Duplicate |
| Is Duplicate | Is Duplicate | Is Not Duplicate | Is Duplicate |
| Is Duplicate | Don't know | Is Duplicate | Is Duplicate |
| Is Duplicate | Don't know | Don't know | Is Duplicate |
| Is Duplicate | Don't know | Is Not Duplicate | Is Duplicate |
| Is Duplicate | Is Not Duplicate | Is Duplicate | Is Duplicate |
| Is Duplicate | Is Not Duplicate | Don't know | Is Duplicate |
| Is Duplicate | Is Not Duplicate | Is Not Duplicate | Is Not Duplicate |
| Don't know | Is Duplicate | Is Duplicate | Is Duplicate |
| Don't know | Is Duplicate | Don't know | Is Duplicate |
| Don't know | Is Duplicate | Is Not Duplicate | Is Duplicate |
| Don't know | Don't know | Is Duplicate | Is Duplicate |
| Don't know | Don't know | Don't know | Is Not Duplicate |
| Don't know | Don't know | Is Not Duplicate | Is Not Duplicate |
| Don't know | Is Not Duplicate | Is Duplicate | Is Not Duplicate |
| Don't know | Is Not Duplicate | Don't know | Is Not Duplicate |
| Don't know | Is Not Duplicate | Is Not Duplicate | Is Not Duplicate |
| Is Not Duplicate | Is Duplicate | Is Duplicate | Is Duplicate |
| Is Not Duplicate | Is Duplicate | Don't know | Is Not Duplicate |
| Is Not Duplicate | Is Duplicate | Is Not Duplicate | Is Not Duplicate |
| Is Not Duplicate | Don't know | Is Duplicate | Is Not Duplicate |
| Is Not Duplicate | Don't know | Don't know | Is Not Duplicate |
| Is Not Duplicate | Don't know | Is Not Duplicate | Is Not Duplicate |
| Is Not Duplicate | Is Not Duplicate | Is Duplicate | Is Not Duplicate |
| Is Not Duplicate | Is Not Duplicate | Don't know | Is Not Duplicate |
| Is Not Duplicate | Is Not Duplicate | Is Not Duplicate | Is Not Duplicate |

Figure 3:
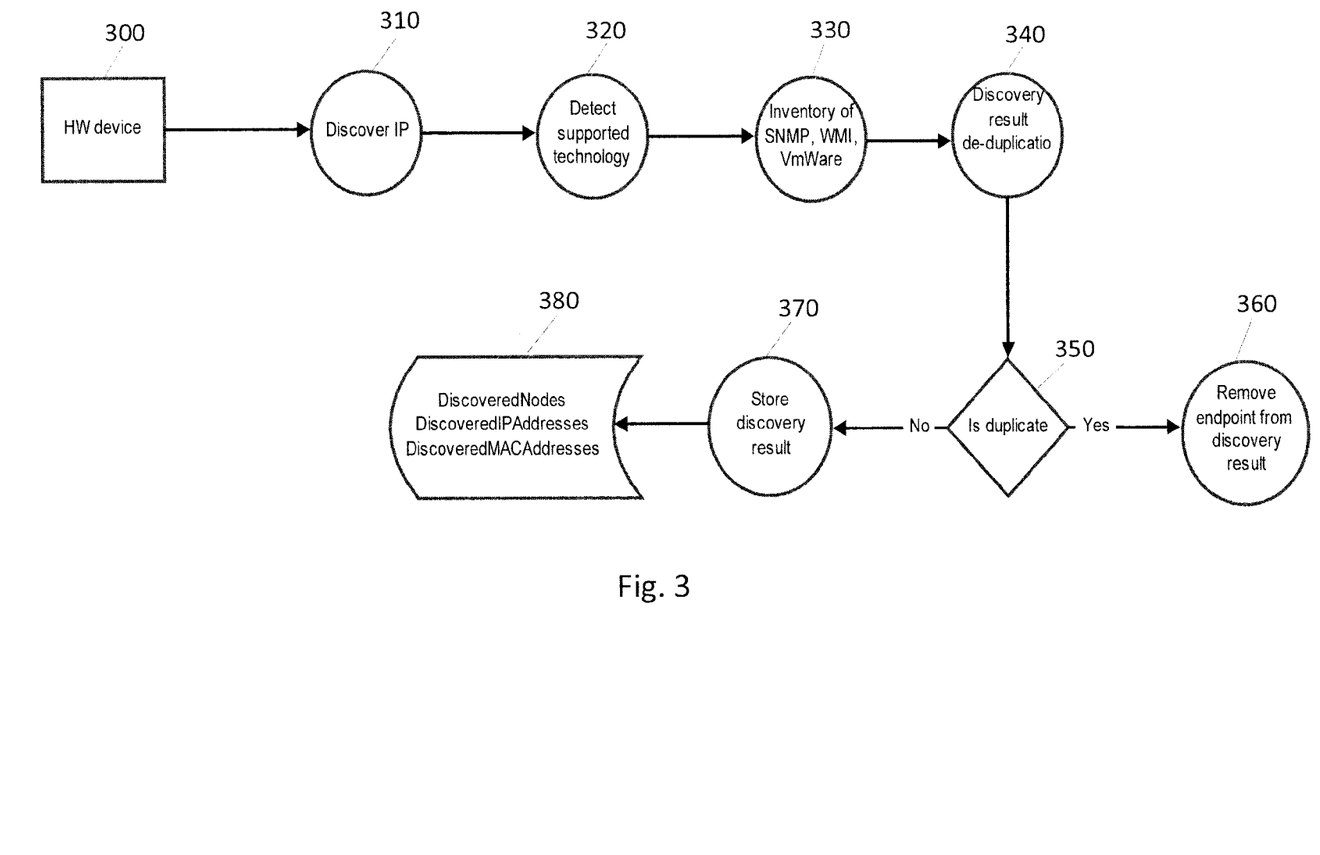
FIG. 3 illustrates a flow diagram of a method according to one embodiment.

FIG. 3 illustrates a flow diagram of a method for node de-duplication according to one embodiment. In the example of FIG. 3, at 300, one or more nodes are discovered. At 310, the associated IP address of the node(s) is discovered. At 320, the supported technology used for obtaining device information, such as SNMP, WMI, etc. is detected. At 330, information about the node(s) is obtained via the (detected) supported technology. At 340, de-duplication of the discovered node(s) is performed. It is determined whether the node(s) is a duplicate at 350. If it is, the duplicate node(s) is omitted from the discovered result set at 360. If the node(s) is not a duplicate, at 370, discovered node(s) are saved to the database. At 380, data associated with discovered node(s) are prepared for discovery import.

Figure 4:
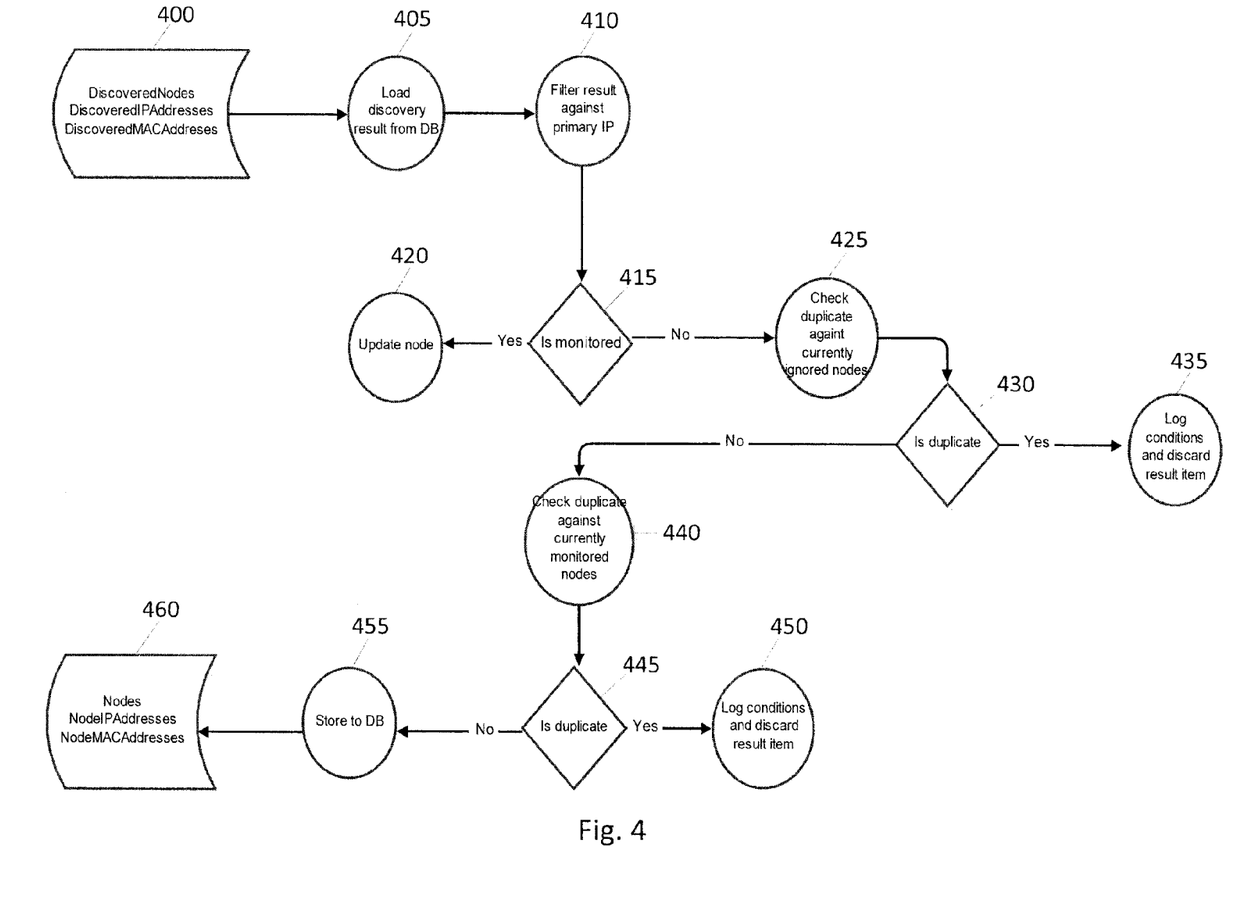
FIG. 4 illustrates a flow diagram of a method according to another embodiment.

FIG. 4 illustrates a flow diagram of a method for node de-duplication according to another embodiment. In the example of FIG. 4, at 400, a result of a discovery job is saved. At 405, the discovery result is loaded and de-serialized from the database. At 410, detection of duplicate is primarily done with primary IP address associated with the node. At 415, it is detected whether node with same IP is already monitored by any engine. If node with same IP is already monitored, the existing node information is updated at 420. If node with same IP is not already monitored, duplicate detection against ignored nodes is performed at 425. At 430, it is determined whether node is a duplicate. If so, the conditions are logged and the duplicate node is discarded at 435. If it is not determined as a duplicate, a duplicate check is performed against all monitored nodes at 440. At 445, it is determined whether node is a duplicate. If it is determined as duplicate, the conditions are logged and the duplicate node is discarded at 450. If it is not determined as a duplicate, node(s) information is saved to persistent storage at 455. At 460, result of discovery import is a list of nodes with associated IP addresses and MAC addresses.

Figure 5:
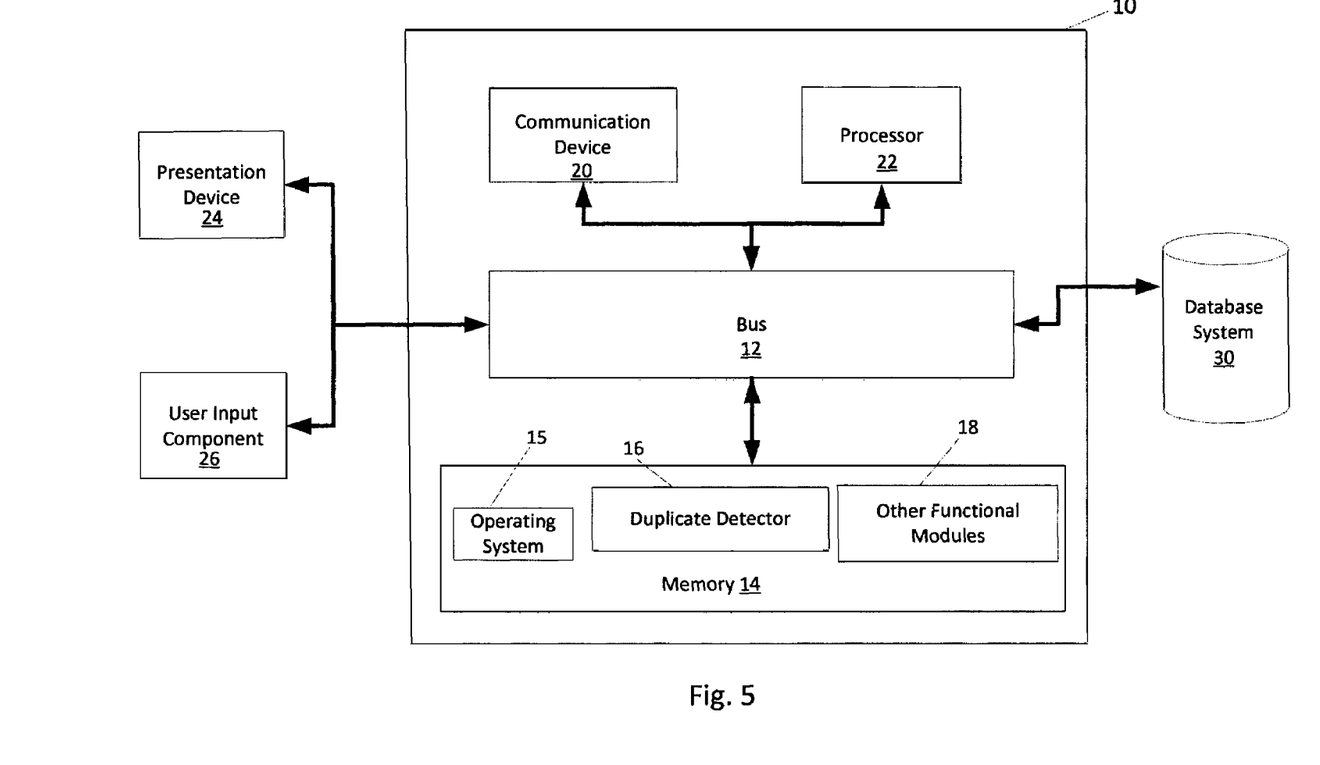
FIG. 5 illustrates a block diagram of an apparatus according to an embodiment.

FIG. 5 illustrates a block diagram of an apparatus 10 that may implement one embodiment of the invention. Apparatus 10 may include a bus 12 or other communications mechanism for communicating information between components of apparatus 10. Apparatus 10 also includes a processor 22, coupled to bus 12, for processing information and executing instructions or operations. Processor 22 may be any type of general or specific purpose processor. Apparatus 10 further includes a memory 14 for storing information and instructions to be executed by processor 22. Memory 14 can be comprised of any combination of random access memory ("RAM"), read only memory ("ROM"), static storage such as a magnetic or optical disk, or any other type of machine or computer readable media. Apparatus 10 further includes a communication device 20, such as a network interface card or other communications interface, to provide access to a network. As a result, a user may interface with apparatus 10 directly or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a presentation device 24, such as a display, monitor, screen, or web browser, for displaying information to a user, such as network traffic information. A user input component 26, such as a keyboard, computer mouse, or web browser, are further coupled to bus 12 to enable a user to interface with apparatus 10. Processor 22 and memory 14 may also be coupled via bus 12 to a database system 30 and, thus, may be able to access and retrieve information stored in database system 30. In one embodiment, database system 30 is the network monitoring system storage 110 illustrated in FIG. 1. Although only a single database is illustrated in FIG. 5, any number of databases may be used in accordance with certain embodiments.

In one embodiment, memory 14 stores software modules that provide functionality when executed by processor 22. The modules may include an operating system 15 that provides operating system functionality for apparatus 10. The memory may also store one or more duplicate detector(s) 16, which supports a node deduplication functionality, as discussed above. The one or more duplicate detector(s) 16 may include, for example, IP address duplicate detector 201, DNS duplicate detector 203, MAC address duplicate detector 202, and Sysname duplicate detector 204, as depicted in FIG. 2 discussed above. Apparatus 10 may also include one or more other functional modules 18 to provide additional functionality.

Database system 30 may include a database server and any type of database, such as a relational or flat file database. Database system 30 may store data related to network traffic flow of each of the entities in the network, and/or any data associated with apparatus 10 or its associated modules and components.

In certain embodiments, processor 22, duplicate detector(s) 16, and other functional modules 18 may be implemented as separate physical and logical units or may be implemented in a single physical and logical unit. Furthermore, in some embodiments, processor 22, duplicate detector(s) 16, and other functional modules 18 may be implemented in hardware, or as any suitable combination of hardware and software.

In some embodiments, processor 22 is configured to control apparatus 10 to discover nodes in a network. According to an embodiment, information identifying the discovered nodes may be stored in database 110, for example. Processor 22 may be configured to control apparatus 10 to collect a list of IP addresses, MAC addresses, DNS names, and sysnames for each of the nodes discovered in the network.

According to one embodiment, processor 22 may be configured to control apparatus 10 to execute an IP duplicate detector configured to compare the IP addresses of each of the discovered nodes with IP addresses of current nodes and other discovered nodes, a MAC duplicate detector configured to compare the MAC addresses of each of the discovered nodes with MAC addresses of the current nodes and the other discovered nodes, a DNS duplicate detector configured to compare the DNS names of each of the discovered nodes with DNS names of the current nodes and the other discovered nodes, and a name duplicate detector configured to compare the sysnames of each of the discovered nodes with sysnames of the current nodes and the other discovered nodes. Processor 22 may then be configured to control apparatus 10 to determine duplicate nodes that are duplicates of the other discovered nodes and/or the current nodes based on the result of comparison of the IP duplicate detector, the MAC duplicate detector, the DNS duplicate detector, and the name duplicate detector.

In an embodiment, processor 22 may be configured to control apparatus 10 to discard the duplicate nodes. According to one embodiment, processor 22 may be configured to control apparatus 10 to assign a priority to each of the IP duplicate detector, the MAC duplicate detector, the DNS duplicate detector, and the name duplicate detector that determines an order of execution. Apparatus 10 may be controlled to determine the duplicate nodes, for example, by executing the following formula:

$$d_1.\text{IsDuplicate}(\ )*d_1.\text{Priority}+\ldots+d_n.\text{IsDuplicate}(\ )*d_n.\text{Priority}.$$

In an embodiment, each of the discovered nodes may be assigned a node ID. Processor 22 may be configured to control apparatus 10 to assign a MatchIndex to each node ID, where the MatchIndex indicates a likelihood of a match between the discovered node and any of the current nodes and the other discovered nodes. According to one embodiment, processor 22 may be configured to control apparatus 10 to group the duplicate nodes by node ID and to sum the MatchIndexes for the same node ID. Additionally, a weight is assigned to each of the IP duplicate detector, the MAC duplicate detector, the DNS duplicate detector, and the name duplicate detector. The weight indicates the reliability of the result provided by the respective duplicate detectors.

Figure 6:
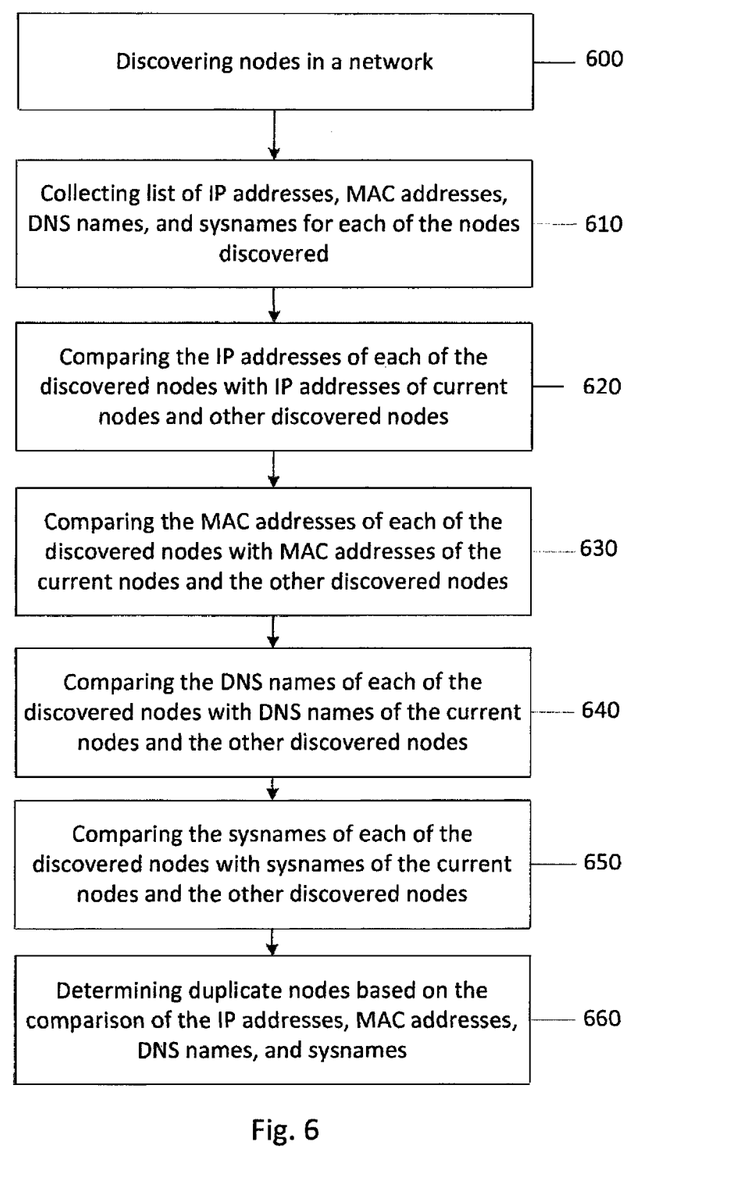
FIG. 6 illustrates a flow diagram of a method according to another embodiment.

FIG. 6 illustrates an example flow chart of a method, according to one embodiment. The method includes, at 600, discovering, for example by a network monitoring apparatus, nodes in a network. The method may then include, at 610, collecting a list of internet protocol (IP) addresses, media access control (MAC) addresses, domain name system (DNS) names, and sysnames for each of the nodes discovered in the network. At 620, the method includes comparing the IP addresses of each of the discovered nodes with IP addresses of current nodes and other discovered nodes, At 630, the method includes comparing the MAC addresses of each of the discovered nodes with MAC addresses of the current nodes and the other discovered nodes. At 640, the method includes comparing the DNS names of each of the discovered nodes with DNS names of the current nodes and the other discovered nodes. At 650, the method includes comparing the sysnames of each of the discovered nodes with sysnames of the current nodes and the other discovered nodes. The method may further include, at 660, determining duplicate nodes that are duplicates of the other discovered nodes and/or the current nodes based on the comparison of the IP addresses, MAC addresses, DNS names, and sysnames.

In some embodiments, the functionality of any of the methods described herein, such as those of FIGS. 3, 4, and 6, may be implemented by software and/or computer program code stored in memory or other computer readable or tangible media, and executed by a processor. In other embodiments, the functionality may be performed by hardware, for example through the use of an application specific integrated circuit (ASIC), a programmable gate array (PGA), a field programmable gate array (FPGA), or any other combination of hardware and software.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   discovering, by a network monitoring apparatus, nodes in a network;
   collecting a list of internet protocol (IP) addresses, media access control (MAC) addresses, domain name system (DNS) names, and sysnames for each of the nodes discovered in the network;
   comparing, by an IP duplicate detector, the IP addresses of each of the discovered nodes with IP addresses of current nodes and other discovered nodes;

comparing, by a MAC duplicate detector, the MAC addresses of each of the discovered nodes with MAC addresses of the current nodes and the other discovered nodes;

comparing, by a DNS duplicate detector, the DNS names of each of the discovered nodes with DNS names of the current nodes and the other discovered nodes;

comparing, by a name duplicate detector, the sysnames of each of the discovered nodes with sysnames of the current nodes and the other discovered nodes;

determining duplicate nodes that are duplicates of the other discovered nodes and/or the current nodes based on the comparison of the IP addresses, MAC addresses, DNS names, and sysnames;

assigning a priority to each of the IP duplicate detector, the MAC duplicate detector, the DNS duplicate detector, and the name duplicate detector that determines an order of execution of each of the comparing steps; and assigning a weight to each of the IP duplicate detector, the MAC duplicate detector, the DNS duplicate detector, and the name duplicate detector, wherein the weight indicates a reliability of a result provided by each of the IP duplicate detector, the MAC duplicate detector, the DNS duplicate detector, and the name duplicate detector.

2. The method according to claim 1, further comprising discarding the duplicate nodes.

3. The method according to claim 1, wherein the determining comprises executing the following formula:

$$d_1.\text{IsDuplicate}( )*d_1.\text{Priority} + \ldots + d_n.\text{IsDuplicate}( )*d_n.\text{Priority}.$$

4. The method according to claim 1, wherein each of the discovered nodes is assigned a node ID, and wherein the method further comprises assigning a MatchIndex to each node ID, the MatchIndex indicating a likelihood of a match between the discovered node and any of the current nodes and the other discovered nodes.

5. The method according to claim 4, further comprising grouping the duplicate nodes by node ID and summing the MatchIndexes for the same node ID.

6. An apparatus, comprising:
at least one processor and at least one memory including computer program code,
the at least one memory and the computer program code are configured, with the at least one processor, to cause the apparatus at least to
discover nodes in a network;
collect a list of internet protocol (IP) addresses, media access control (MAC) addresses, domain name system (DNS) names, and sysnames for each of the nodes discovered in the network;
wherein the at least one processor is further configured to execute:
an IP duplicate detector configured to compare the IP addresses of each of the discovered nodes with IP addresses of current nodes and other discovered nodes;
a MAC duplicate detector configured to compare the MAC addresses of each of the discovered nodes with MAC addresses of the current nodes and the other discovered nodes;
a DNS duplicate detector configured to compare the DNS names of each of the discovered nodes with DNS names of the current nodes and the other discovered nodes;
a name duplicate detector configured to compare the sysnames of each of the discovered nodes with sysnames of the current nodes and the other discovered nodes;
wherein the at least one memory and the computer program code are further configured, with the at least one processor, to cause the apparatus at least to
determine duplicate nodes that are duplicates of the other discovered nodes and/or the current nodes based on the result of comparison of the IP duplicate detector, the MAC duplicate detector, the DNS duplicate detector, and the name duplicate detector;
assign a priority to each of the IP duplicate detector, the MAC duplicate detector, the DNS duplicate detector, and the name duplicate detector that determines an order of execution; and
assign a weight to each of the IP duplicate detector, the MAC duplicate detector, the DNS duplicate detector, and the name duplicate detector, wherein the weight indicates a reliability of a result provided by each of the IP duplicate detector, the MAC duplicate detector, the DNS duplicate detector, and the name duplicate detector.

7. The apparatus according to claim 6, wherein the at least one memory and the computer program code are further configured, with the at least one processor, to cause the apparatus at least to discard the duplicate nodes.

8. The apparatus according to claim 6, wherein the at least one memory and the computer program code are further configured, with the at least one processor, to cause the apparatus at least to determine the duplicate nodes by executing the following formula:

$$d_1.\text{IsDuplicate}( )*d_1.\text{Priority} + \ldots + d_n.\text{IsDuplicate}( )*d_n.\text{Priority}.$$

9. The apparatus according to claim 6, wherein each of the discovered nodes is assigned a node ID, and wherein the at least one memory and the computer program code are further configured, with the at least one processor, to cause the apparatus at least to assign a MatchIndex to each node ID, the MatchIndex indicating a likelihood of a match between the discovered node and any of the current nodes and the other discovered nodes.

10. The apparatus according to claim 9, wherein the at least one memory and the computer program code are further configured, with the at least one processor, to cause the apparatus at least to group the duplicate nodes by node ID and to sum the MatchIndexes for the same node ID.

11. The apparatus according to claim 6, wherein a weight is assigned to each of the IP duplicate detector, the MAC duplicate detector, the DNS duplicate detector, and the name duplicate detector, wherein the weight indicates the reliability of the result provided by the respective duplicate detectors.

12. A computer program, embodied on a non-transitory computer readable medium, wherein the computer program is configured to control a processor to execute a process, comprising:
discovering, by a network monitoring apparatus, nodes in a network;
collecting a list of internet protocol (IP) addresses, media access control (MAC) addresses, domain name system (DNS) names, and sysnames for each of the nodes discovered in the network;
comparing, by an IP duplicate detector, the IP addresses of each of the discovered nodes with IP addresses of current nodes and other discovered nodes;

comparing, by a MAC duplicate detector, the MAC addresses of each of the discovered nodes with MAC addresses of the current nodes and the other discovered nodes;

comparing, by a DNS duplicate detector, the DNS names of each of the discovered nodes with DNS names of the current nodes and the other discovered nodes;

comparing, by a name duplicate detector, the sysnames of each of the discovered nodes with sysnames of the current nodes and the other discovered nodes;

determining duplicate nodes that are duplicates of the other discovered nodes and/or the current nodes based on the comparison of the IP addresses, MAC addresses, DNS names, and sysnames; and assigning a priority to each of the IP duplicate detector, the MAC duplicate detector, the DNS duplicate detector, and the name duplicate detector that determines an order of execution of each of the comparing steps; and assigning a weight to each of the IP duplicate detector, the MAC duplicate detector, the DNS duplicate detector, and the name duplicate detector, wherein the weight indicates a reliability of a result provided by each of the IP duplicate detector, the MAC duplicate detector, the DNS duplicate detector, and the name duplicate detector.

* * * * *